(12) United States Patent
Bertels et al.

(10) Patent No.: US 12,090,968 B2
(45) Date of Patent: Sep. 17, 2024

(54) WIPER BLADE, IN PARTICULAR FOR A MOTOR VEHICLE

(71) Applicant: Robert Bosch GmbH, Stuttgart (DE)

(72) Inventors: Claus Bertels, Leuven (BE); Helmut Depondt, Boutersem (BE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 18/044,693

(22) PCT Filed: Jul. 16, 2021

(86) PCT No.: PCT/EP2021/069981
§ 371 (c)(1),
(2) Date: Mar. 9, 2023

(87) PCT Pub. No.: WO2022/053209
PCT Pub. Date: Mar. 17, 2022

(65) Prior Publication Data
US 2023/0406266 A1 Dec. 21, 2023

(30) Foreign Application Priority Data
Sep. 11, 2020 (DE) ............ 10 2020 211 424.2

(51) Int. Cl.
*B60S 1/52* (2006.01)
*B60S 1/38* (2006.01)

(52) U.S. Cl.
CPC ............ *B60S 1/524* (2013.01); *B60S 1/3886* (2013.01); *B60S 1/3887* (2013.01); *B60S 1/3806* (2013.01); *B60S 1/3881* (2013.01); *B60S 1/3889* (2013.01)

(58) Field of Classification Search
CPC ........ B60S 1/524; B60S 1/522; B60S 1/3886; B60S 1/3887; B60S 1/3889; B60S 1/3894; B60S 1/3896; B60S 1/3893; B60S 1/381; B60S 1/3891; B60S 1/3881; B60S 1/3806
USPC ........................................ 15/250.04, 250.201
See application file for complete search history.

(56) References Cited

U.S. PATENT DOCUMENTS

| | | | | |
|---|---|---|---|---|
| 2,910,715 A | * | 11/1959 | Ohrt ................. | B60S 1/524 |
| | | | | 15/250.04 |
| 4,893,374 A | * | 1/1990 | Bienert .............. | B60S 1/34 |
| | | | | 15/250.04 |
| 11,623,615 B2 | * | 4/2023 | Caillot .............. | B60S 1/3887 |
| | | | | 15/250.04 |

FOREIGN PATENT DOCUMENTS

| | | |
|---|---|---|
| DE | 102017223526 A1 | 6/2019 |
| EP | 2241484 A1 | 10/2010 |
| WO | 2009130183 A1 | 10/2009 |
| WO | 2020064445 A1 | 4/2020 |

OTHER PUBLICATIONS

Translation of International Search Report for Application No. PCT/EP2021/069981 dated Oct. 13, 2021 (2 pages).

* cited by examiner

*Primary Examiner* — Gary K. Graham
(74) *Attorney, Agent, or Firm* — Michael Best & Friedrich LLP

(57) ABSTRACT

The invention relates to a wiper blade (10), in particular for a motor vehicle. Said wiper blade comprises a wiper strip (12), a supporting element (14), a liquid channel (26), and a wind deflector strip (18). According to the invention, a closure stopper (36) closes the liquid channel (26) at at least one channel end (34) in the region of an end cap (22) without being in contact with the end cap.

9 Claims, 4 Drawing Sheets

WIPER BLADE, IN PARTICULAR FOR A MOTOR VEHICLE

BACKGROUND OF THE INVENTION

The invention relates to a wiper blade, in particular for a motor vehicle.

Numerous wiper blades which have a wiper strip, a supporting element, a liquid channel, a closure plug and a wind deflector strip have already become known. By means of such wiper blades, liquid can be directly applied to the window swept by the wiper blade, whereby a significant cleaning action is achieved. The decisive factor here relative to the cleaning action is the distribution of the contact force with which the wiper strip is pressed against the window.

SUMMARY OF THE INVENTION

The wiper blade according to the invention has the advantage that the closure plug closes the liquid channel on at least one channel end in the region of an end cap without being in contact with the end cap. In this manner, the distribution of the contact force is not influenced in any way and a reliable closure of the liquid channel is still implemented.

If the end cap is fastened to the supporting element and seals this supporting element along a longitudinal extent, the distribution of the contact force is advantageously not influenced.

The liquid channel is arranged in the wind deflector strip in a simple, cost-effective and thus advantageous manner.

In a simple and thus advantageous embodiment, the closure plug is fully inserted into the liquid channel. In particular, it is ensured thereby that the closure plug does not come into contact with the end cap.

In a particularly cost-effective and thus advantageous embodiment, the closure plug is configured to be ball-shaped, in particular as a steel ball. During assembly, such a ball can be inserted in a simple manner into the liquid channel for the sealing, without a preferred direction having to be taken into account.

To ensure the contact-free closure and for the secure closure, the spacing between the plug end of the closure plug on the end side and the channel end of the liquid channel is at least 1 mm, in particular at least 3 mm, preferably at least 5 mm.

It can also be regarded as advantageous if the spacing between a plug end of the closure plug on the end side and the end cap is at least 1 mm, in particular at least 3 mm, preferably at least 5 mm. In this manner, the contact-free closure is ensured.

If the liquid channel is provided for metering liquid, an optimal cleaning result is advantageously produced on the window.

BRIEF DESCRIPTION OF THE DRAWINGS

An exemplary embodiment of the invention is shown in the drawings and explained in more detail in the following description. In the drawings.

DETAILED DESCRIPTION

Figure 1:
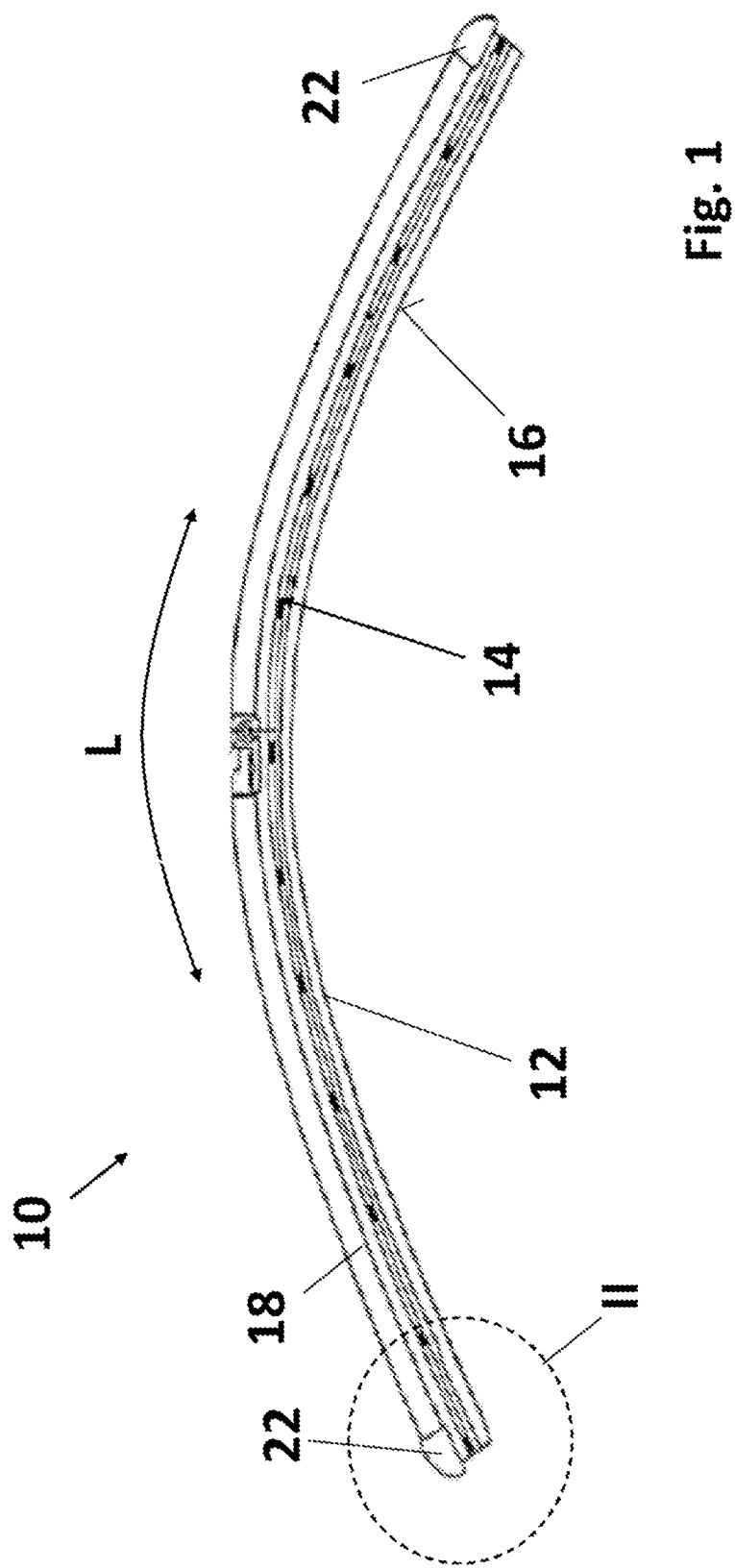
FIG. 1 shows a wiper blade according to the invention in a schematic side view.

In FIG. 1 a wiper blade 10 according to the invention is shown in a schematic side view. This wiper blade comprises a wiper strip 12 which is fastened to a supporting element 14. The wiper strip 12 consists of a rubber material and during operation bears with a wiper edge 16 against a window, for example the windshield of a motor vehicle. The supporting element 14 is produced from flexible strip steel and is pre-bent such that, when it bears against the curved window with a contact force, the wiper strip 12 is pressed along its entire longitudinal extent L against the window. A wind deflector strip 18 which substantially extends over the entire longitudinal extent L is arranged on the side of the supporting element 14 facing away from the wiper strip 12. The wind deflector strip 18 is positively fastened here to the supporting element 14. The wind deflector strip 18 is also configured from at least partially resilient plastics and produced, for example, in a multi-component extrusion method. A fastening adapter 20 which serves for fastening the wiper blade 10 to the wiper arm of a windshield wiper device is fastened to the supporting element 14 approximately in the center of the longitudinal extent L. In each case, an end cap 22 which seals the wiper blade 10 along its longitudinal extent L is arranged at the ends relative to the longitudinal extent L. The end cap 22 is positively fastened to the supporting element 14, for example by a latching connection.

Figure 2:
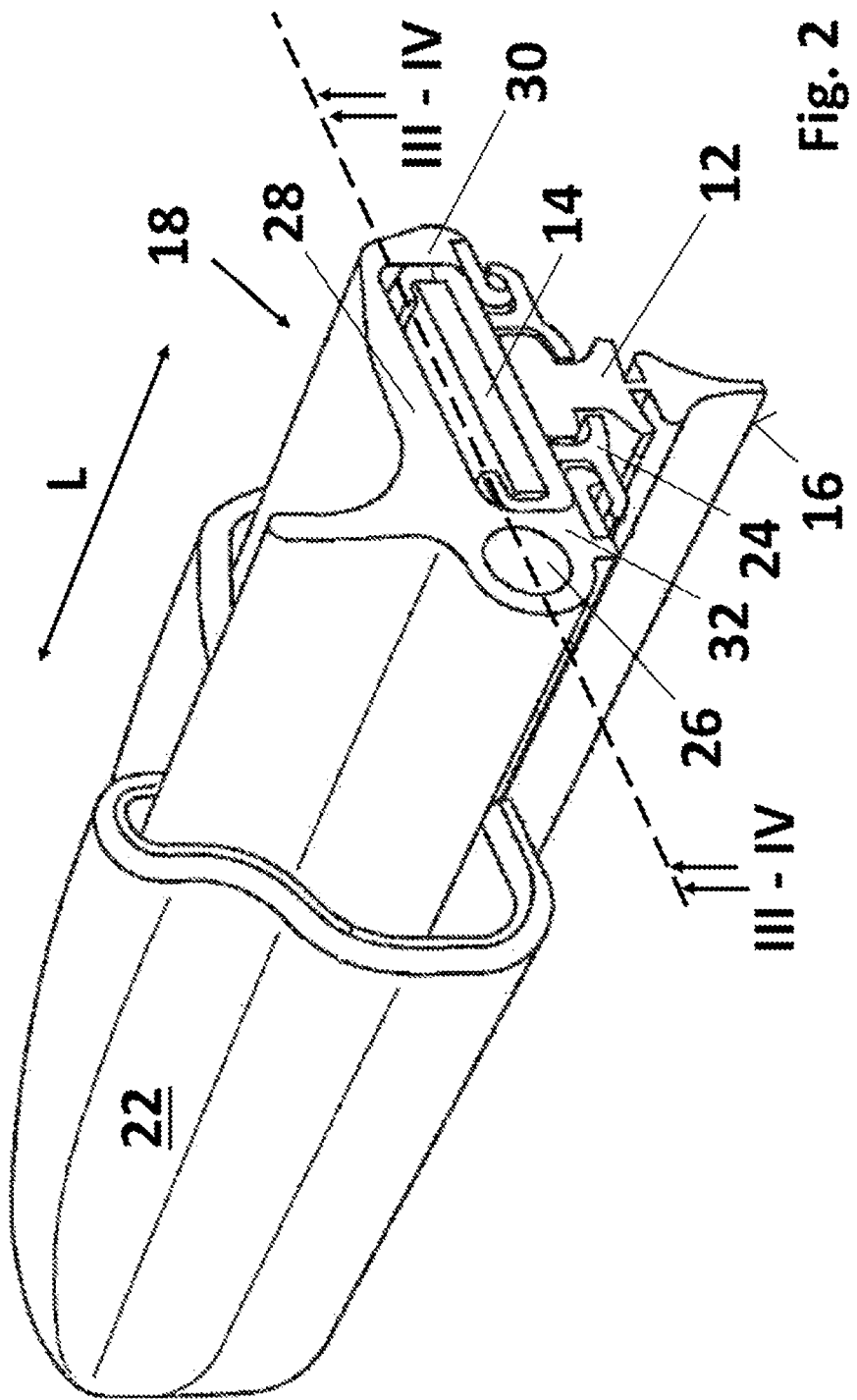
FIG. 2 shows the end of a wiper blade according to the invention in a partial sectional view.

In FIG. 2 the end of a wiper blade 10 according to the invention, thus the region of one of the end caps 22, is shown in a partial sectional view. The wiper strip 12 is fastened by a fastening rail 24 to the supporting element 14. The wind deflector strip 18 is wrapped positively around the fastening rail 24 and thus around the supporting element 14. The fastening rail 24 is designed here with a double-clamping action, such that the one clamp faces away from the supporting element 14 and holds the wiper strip 12, and the other clamp faces toward the supporting element 14 and wraps around and holds this supporting element.

The wind deflector strip 18 has a hollow channel as the liquid channel 26 along its longitudinal extent L. During operation, this liquid channel 26 transports cleaning liquid from the fastening adapter 20 in the direction of the end cap 22. The end cap 22 encloses the end of the supporting element 14 and the wind deflector strip 18. Thus the outer end of the wind deflector strip 18 and the outer end of the supporting element 14 are arranged inside the end cap 22 and thus received therein. As a result, the outer end of the liquid channel 26 is also arranged in the region of the end cap 22. The liquid channel 26 also has spray openings through which cleaning liquid can pass in the direction of the window or the wiper strip 12, when the cleaning liquid located in the liquid channel 26 is subjected to pressure, for example by a pump, so that the window can be actively wetted, i.e. liquid can be applied thereto.

The wind deflector strip 18 is of a substantially U-shaped design and thus has a base 28 and a first fastening limb 30 and a second fastening limb 32. The liquid channel 26 is arranged in the region of the second fastening limb 32 but in a variation can also be arranged in the region of the first fastening limb 30 or run in the region of the base 28.

Figure 3:
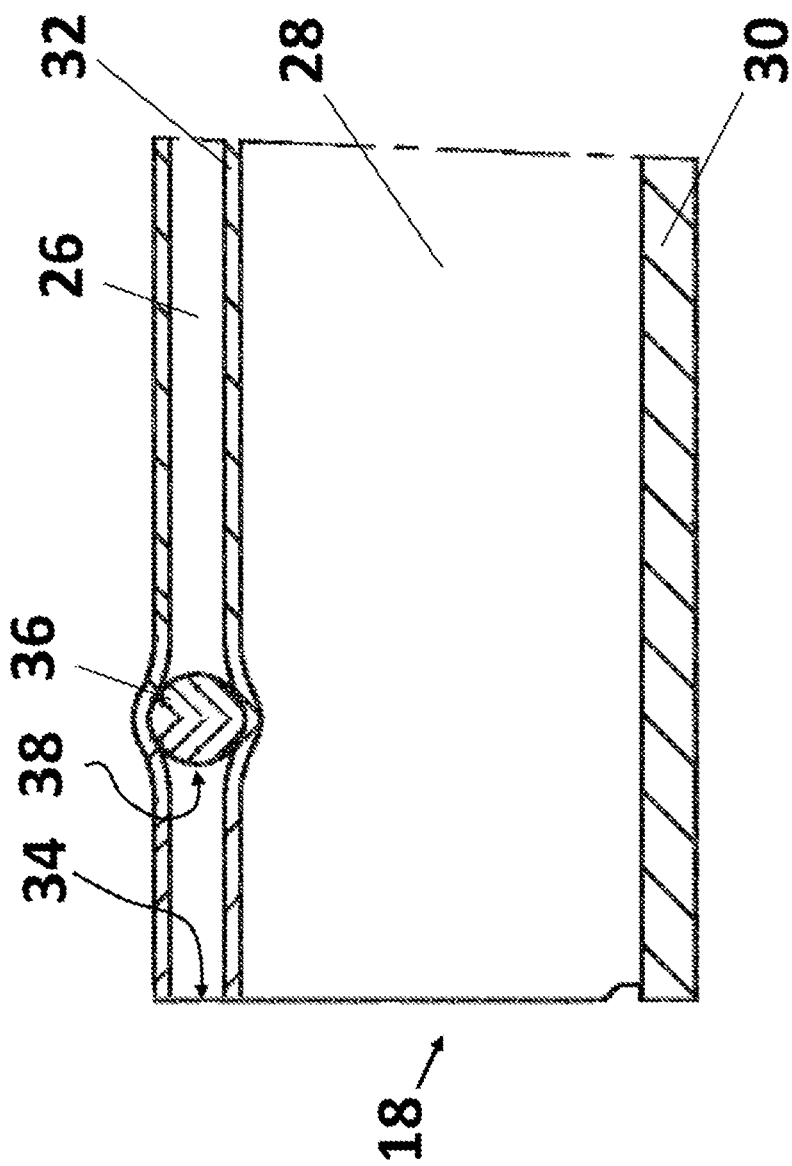
FIG. 3 shows a longitudinal section in the region of an end of the wind deflector strip and FIG. 4 shows the longitudinal section as shown in FIG. 3 but with the end cap.

In FIG. 3 a longitudinal section is shown parallel to a plane spanned by the strip-like supporting element 14, in the region of an end of the longitudinal extent L of the wind deflector strip 18 with the liquid channel 26. The end of the wind deflector strip 18, and thus also the end of the liquid channel 26, which forms a channel end 34, is shown in the image to the left. In the region of this open end of the liquid channel 26 a closure plug 36 is inserted into the liquid channel 26 in order to close this liquid channel. The closure plug 36 thus closes the liquid channel 26 in the region of the outer end, i.e. in the vicinity of the channel end 34, in the region of the end cap 22.

The closure plug 36 is configured as a steel ball and is inserted into the liquid channel 26 approximately 8 mm from the end, when observed. The closure plug 36 has an external diameter which is slightly larger than the internal diameter of the liquid channel 26. The closure plug 36 is fully inserted into the liquid channel 26 and thus exclusively comes into contact with the wall of the liquid channel 26 and otherwise is contact-free, in particular the closure plug 36 is not in contact with the end cap 22 (FIG. 2). The side of the closure plug 36 facing toward the channel end 34 forms a plug end 38 which is spaced apart from the channel end 34 by several millimeters, preferably at least 5 mm, in this case 7 mm.

Figure 4:
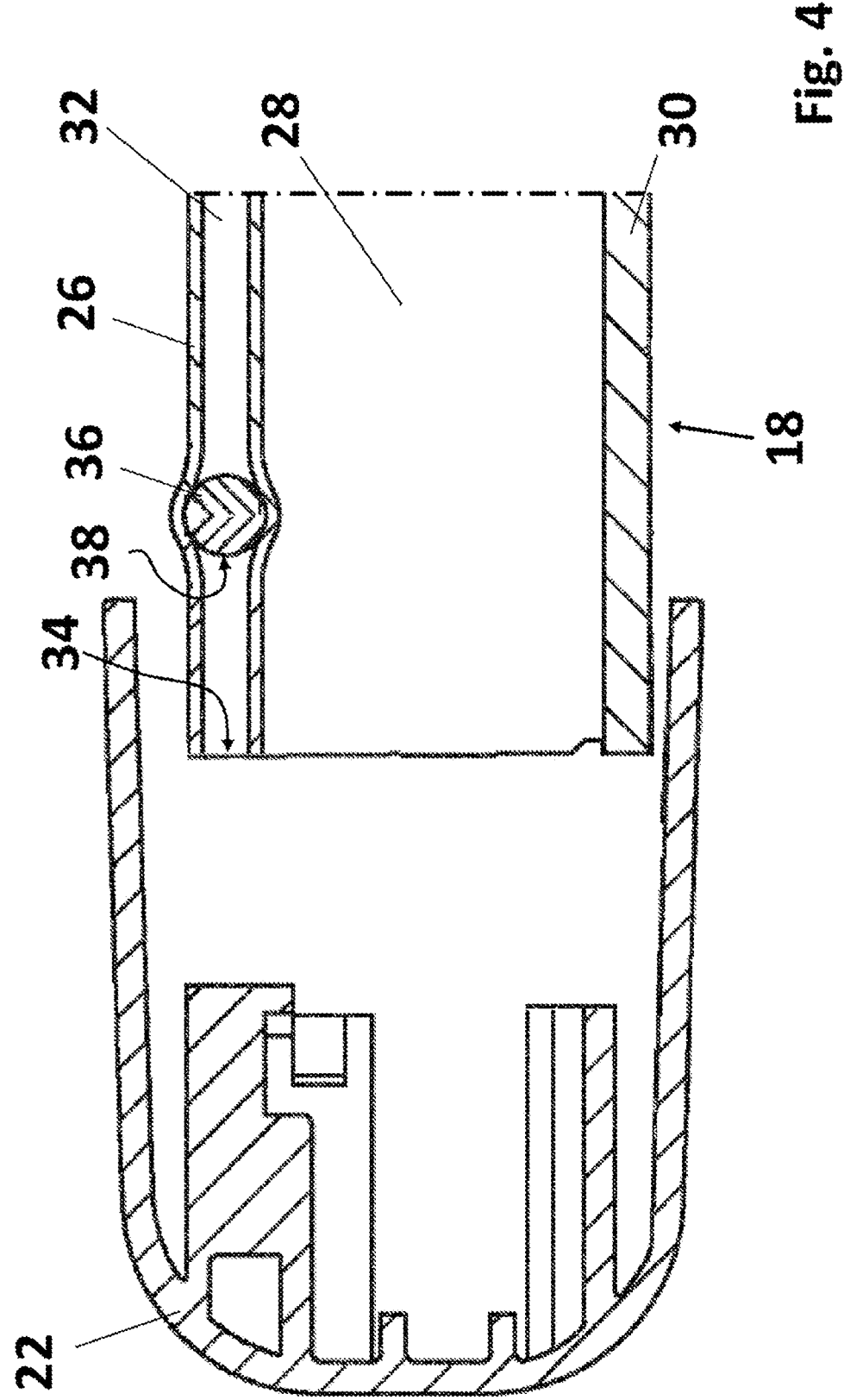

In FIG. 4 the same longitudinal section is shown as in FIG. 3, but the end cap 22 is also shown. The embodiments regarding FIG. 3 thus apply unchanged with regard to FIG. 4.

The end cap 22 wraps around the end of the wind deflector strip 18 with the channel end 34. However, the wind deflector strip 18 is movable relative to the end cap 22, in particular in the longitudinal direction L, to permit an unhindered bending of the supporting element 14. The channel end 34 is thus open and not connected to the end cap 22. The closure plug 36 closes the liquid channel 26 in the region of the end cap 22 but is not connected to the end cap 22 and thus can be characterized as not being in contact with the end cap. The spacing between the closure plug 36 and the end cap 22 is approximately 10 mm here, but smaller or larger spacings are also possible.

In a variation of the invention, the liquid channel 26 can also be configured separately from the wind deflector strip 18. The closure plug 36 can also be shaped, for example, in a conical or frustoconical shape. The closure plug 36 can also be configured from plastics or ceramic. A closure plug 36 made from wood is also possible. In a further variant, the closure plug 36 can also have an auxiliary element for inserting into the liquid channel 26. The auxiliary element can be configured, for example, as a rod-shaped extension. In a variant, the auxiliary element is provided with a predetermined rupture point so that the auxiliary element can be removed in a simple manner—at least partially—after inserting the closure plug 36.

What is claimed is:

1. A wiper blade (10) comprising a wiper strip (12), a supporting element (14), a liquid channel (26), a closure plug (36), an end cap (22) defining a receiving cavity, and a wind deflector strip (18), characterized in that the end cap (22) is assembled on the wind deflector strip (18), wherein the liquid channel (26) is disposed within the wind deflector strip (18) and extends along a longitudinal extent (L) to a channel end (34), wherein the closure plug (36) is disposed entirely within the liquid channel (26) and closes the liquid channel (26) in a region of the channel end (34), wherein the channel end (34) is disposed within the receiving cavity of the end cap (22), wherein the channel end (34) is not connected to or in contact with any component of the end cap (22), such that the channel end (34) is open to the receiving cavity within the end cap (22), and wherein the closure plug (36) is not connected to or in contact with any component of the end cap (22), and is spaced away from the channel end (34).

2. The wiper blade (10) as claimed in claim 1, wherein the end cap (22) is fastened to the supporting element (14) and seals the supporting element along a longitudinal extent (L).

3. The wiper blade (10) as claimed in claim 1, wherein the closure plug (36) is ball-shaped.

4. The wiper blade (10) as claimed in claim 3, wherein the closure plug (36) is a steel ball.

5. The wiper blade (10) as claimed in claim 1, wherein a spacing between a plug end (38) of the closure plug (36) and the channel end (34) of the liquid channel (26) in the longitudinal extent (L) is at least 1 millimeter.

6. The wiper blade (10) as claimed in claim 5, wherein the spacing is at least 5 millimeters.

7. The wiper blade (10) as claimed in claim 1, wherein a spacing between a plug end (38) of the closure plug (36) and the end cap (22) is at least 1 millimeter.

8. The wiper blade (10) as claimed in claim 7, wherein the spacing is at least 5 millimeters.

9. The wiper blade (10) as claimed in claim 1, wherein the liquid channel (26) is provided for active wetting.

* * * * *